April 4, 1967  A. H. OLDHAM  3,312,363
CAR TOP BOAT CARRIER AND HANDLING ASSEMBLY
Filed Oct. 22, 1965
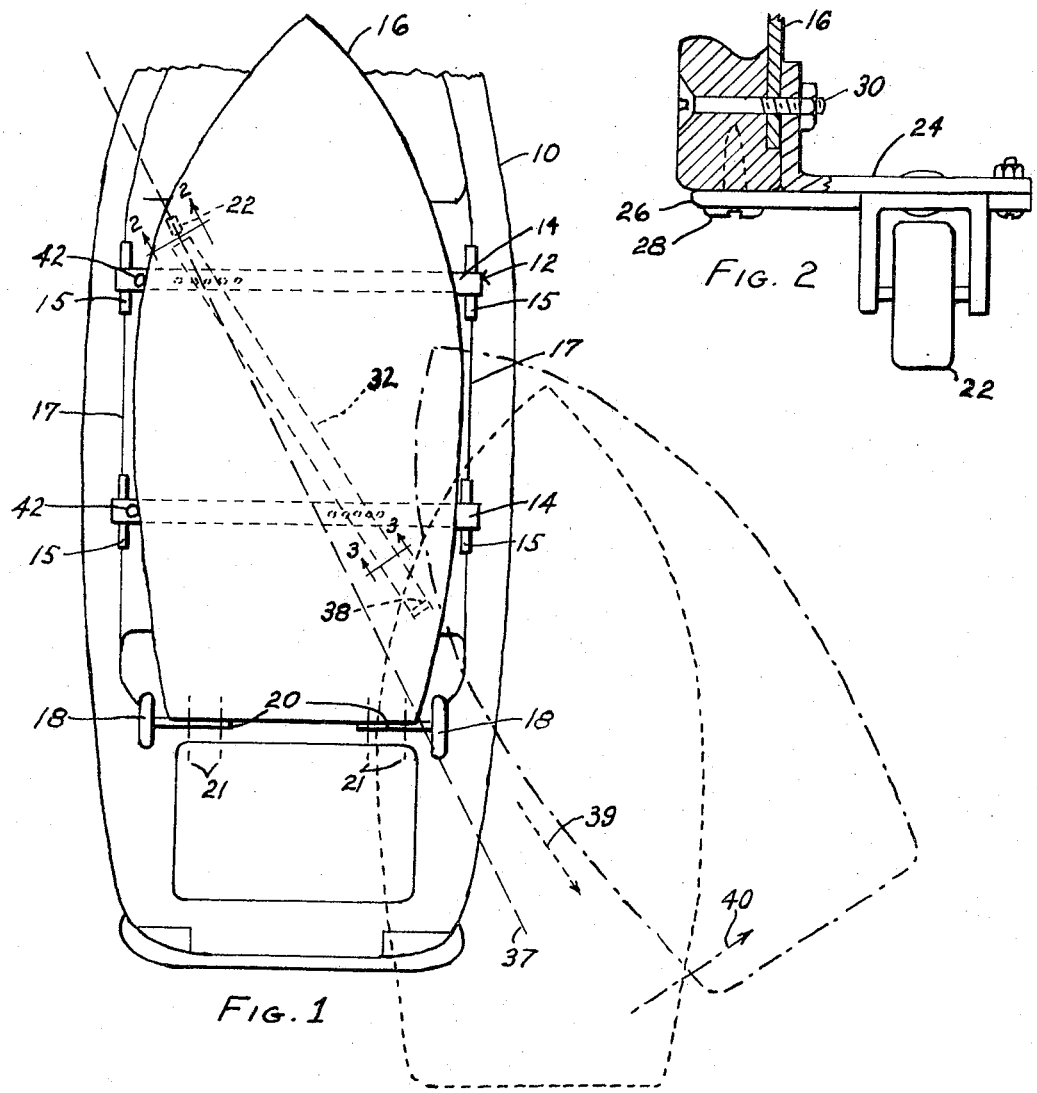
FIG. 1
FIG. 2
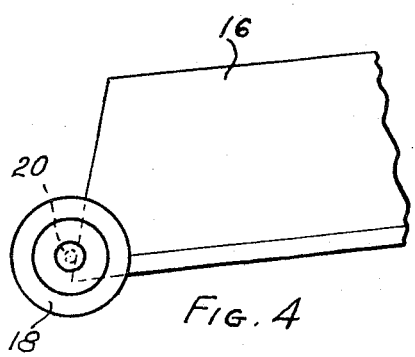
FIG. 4
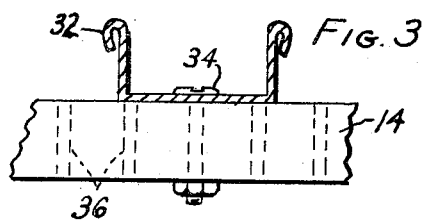
FIG. 3
INVENTOR.
ALBERT H. OLDHAM
BY
Oldham & Oldham
ATTYS.

3,312,363
CAR TOP BOAT CARRIER AND HANDLING
ASSEMBLY
Albert H. Oldham, 3031 Silver Lake Blvd.,
Cuyahoga Falls, Ohio 44224
Filed Oct. 22, 1965, Ser. No. 501,216
4 Claims. (Cl. 214—450)

This invention relates to a boat and a boat-carrying car top rack, and is particularly concerned with an assembly facilitating one man loading and unloading of a boat to and from a rack mounted on top of a car or the like, and to handle the boat to and from a lake.

It is the general object of the present invention to provide apparatus of the designated character which efficiently and easily permits a single person to remove a boat carried on top of a car, to replace the boat back on top of the car after the boat has been used, and to transport the boat when unloaded to and from the car and a body of water.

In the drawings, FIG. 1 is a plan view of the invention, with the automobile partially broken away, showing the car top boat rack with the boat mounted thereon;

FIG. 2 is an enlarged side elevation, partially in cross section, as seen from line 2—2 of FIG. 1 and illustrating a roller secured to the boat and incorporated into the apparatus of the invention;

FIG. 3 is a cross sectional view, partially broken away, taken along lines 3—3 of FIG. 1, illustrating the channel means secured to the car top boat rack;

FIG. 4 is a side elevation, partially broken away illustrating the wheels secured to the back end of a boat and incorporated into the apparatus of the invention.

In the drawings, and particularly FIG. 1, the numeral 10 indicates a standard automobile, partially broken away. Mounted on the car is a conventional car top rack, generally indicated by the numeral 12. The car top rack 12 can be constructed in a variety of known ways, but the rack should have at least two laterally extending, longitudinally spaced, substantially horizontal surfaces of a width to support a load carried thereon. These horizontal supports, indicated by the numeral 14, extend transversely across the car top and are secured to the car in a number of known ways, this usually being accomplished by a pair of adjustable brackets 15, which are secured to or near the ends of the supports 14 and clamped around the drip molding or rain gutter 17 of the car. The brackets 15 usually have some type of rubber cushion secured thereto which eliminates damage or scratching of the car and helps insure a tight fit of the rack 12 onto the top of the car.

Carried on top of the car 10, and being supported thereon by the car top rack 12, is a boat 16, of "car top" type, by which is meant a boat usually about ten to fourteen feet in length and of light weight construction, normally weighing between about seventy and one hundred and forty pounds. In order to adapt the boat for use in the combination of the invention, a pair of wheels 18, are secured to the top of the stern of the boat, this being best indicated by FIGS. 1 and 4. The wheels 18 are mounted on stub axles 20 secured at about gunnel level to the stern of the boat 16 by conventional bolt means, indicated diagrammatically at 21.

Also added to the boat 16 is a caster or roller 22 which is fastened to the front gunnel portion of the boat 16 by one or more braces 24 and 26, which are secured to the gunnel by bolts or screws 28 and 30. The purpose of such wheels 18 and roller 22 will become evident hereinafter.

Adjustably secured to the supports 14 is a guide for the roller 22. This preferably takes the form of an open top channel 32, which is best illustrated by FIG. 3. The channel 32 is secured to the supports 14 by standard flat head or countersunk bolt means 34, in selected ones of the holes or openings 36 which have been placed in the supports 14. The holes 36 which have been placed in the supports 14 permit the channel 32 to be secured to the supports 14 in a selected position so that the angle existing between the channel 32, the boat, the car, and the supports 14 can be adjusted to and secured in the best operative position.

In order to determine approximately what angle or position the channel 32 should form with the supports 14, it first must be determined at what point on the gunnel of the boat 16 the roller 22 should be secured. In order to determine this, the center of gravity of the boat must be determined. The roller 22 is positioned substantially in a vertical plane extending from the right stern of the inverted boat through the center of gravity of the boat, the axis of the roller being substantially perpendicular to this plane. At what position this plane crosses the gunnel of the boat 16 can most easily be determined by simply placing the boat 16 flat on the ground in an overturned position. Then, by simply grasping the gunnel of the boat at various points along the left side of the inverted boat near the bow, and attempting to lift the boat, a point can be found where the boat can be balanced on the right rear corner of the boat. It is at this point that the roller 22 is mounted. Thus a center of gravity line or plane 37 exists between the right rear corner of the inverted boat and the mounted roller. The channel 32 should have its front end substantially in this vertical plane near the roller 22 and should extend rearwardly toward an area near the right rear corner of the inverted boat on the car top rack 12. Usually the channel 32 extends more towards the side of the car 10 and close to the right gunnel of the inverted boat, as seen in the drawing (FIG. 1), to facilitate loading and unloading of the boat from the side of the car, and to eliminate too long an overhang of the channel beyond the rear support 14.

The actual apparatus of the invention, and the interrelation of the parts hereinbefore described, can best be understood by relating how the actual unloading and loading of the boat 16 off and on the rack 12 is accomplished. Assuming the boat 16 is on the rack 12 in inverted position the roller 22 is then adjacent to the forward end of the channel 32. Any straps or clamps of known type and not shown securing the boat to the car top rack are removed and the operator desiring to remove the boat from the rack first goes around to the front left side of the car and reaches up at or near the gunnel of the boat where the roller 22 is positioned and pushes the boat in an upward and slightly backward direction until the roller 22 is placed on the forward extending edge of the channel 32. The gunnels of the boat slide on the rear support 14 during this operation. The operator then travels around to the right back side of the car and stooping under the right corner of the inverted boat, places the boat on his shoulder and lifts upwardly, lifting until the boat is entirely off the rack 12 and is resting on the roller 22 and on his shoulder.

For reasons aforesaid, the boat is in balance even though the operator has picked up only one corner thereof which he is able to do from the side of the car. With the long trunk present on modern sedan cars, the boat cannot be reached and lifted directly from the rear.

The operator carrying the boat on his shoulder then steps in a backward direction generally indicated by the arrow 39 in FIG. 1, the boat rolling on the roller until the roller comes in contact with a stop 38, positioned at the rear end of the channel 32. The boat will now be in the position indicated by the dotted lines in FIG. 1.

With the shoulder of the operator still under the right corner of the inverted boat, the operator now uses the roller 22 as a pivot point and moves in a direction to the right, indicated by the arrow 40 in FIG. 1, to position the boat in the chain dotted position of FIG. 1. This move is necessary in order to clear the rear of the boat from the car and to permit the operator to now drop the stern of the inverted boat to the ground. With the inverted boat now supported by its wheels 18 on the ground and its front end being supported by the roller 22 in the end of the channel 32, the operator moves to the right front of the inverted boat, and reaching under the boat, lifts the roller 22 and boat off the channel and lowers the front of the boat to waist level. The operator now rolls the boat on the wheels 18 to the edge of the water, inverts the boat, and launches it.

When the boat has been used, and it is desired to return the boat back onto the boat rack 12, the operator wheels the inverted boat back to the side of the car to about the chain-dotted position, and jockeying the boat back and forth on the wheels 18, reaches the position where the roller 22 can be dropped in the end of the channel 32 and the side of the boat clears the side of the car. The operator now raises the back right corner of the inverted boat, swings the boat to the dotted line position with the boat pivoting on the roller 22, and pushes the boat forward with the front portion of the inverted boat rolling on the roller 22. When the roller 22 reaches the forward end of the channel 32, the roller will drop off the end of the channel to bring the gunnels of the boat 16 into engagement with the car top rack 12. When such occurs, the boat 16 should be in exact forward and backward, or longitudinal position in relation to the car top rack. A pair of lateral side stops 42 on the rack 12, and illustrated in FIG. 1, may be provided to aid in the lateral positioning of the boat 16 during loading.

It should be understood that there can be variations in the channel 32 to account for boats of slightly larger or smaller dimensions and that the ability to adjust the channel 32 in any of the holes 36 permits the apparatus of the invention to be easily adapted to various size boats.

While a certain representative embodiment and details have been shown for the purpose of illustrating the invention, it will be apparent to those skilled in this art that various changes and modifications may be made therein without departing from the spirit or scope of the invention.

What is claimed is:

1. A one-man car top boat and carrier including a boat, a rack adapted to be secured to the top of a car and having at least two laterally extending, longitudinally spaced, substantially horizontal surfaces, of a width to support the inverted boat with the gunnels thereof engaging the surfaces, a roller mounted on the left front gunnel of the inverted boat and extending downwardly therefrom, the roller being positioned substantially in a vertical plane extending from the inverted right rear of the boat through the center of gravity of the boat and the axis of the roller being substantially perpendicular to the plane, an open-topped channel mounted on the rack and extending from just short of the roller generally towards the right rear corner of the boat but terminating short of the corner, a stop at the rear of the channel, and wheels on the lower rear corners of the inverted boat.

2. A one-man car top boat and carrier including a boat, a rack adapted to be secured to the top of a car and having at least two laterally extending, longitudinally spaced, substantially horizontal surfaces, of a width to support the inverted boat with the gunnels thereof engaging the surfaces, a roller mounted on the left front gunnel of the inverted boat and extending downwardly therefrom, the roller being positioned substantially in a vertical plane extending from the inverted right rear corner of the boat through the center of gravity of the boat, an open-topped channel mounted on the rack and extending from just short of the roller towards the right rear side of the boat but terminating short of the side, and a stop at the rear of the channel.

3. A one-man car top boat and carrier including a boat, a rack adapted to be secured to the top of a car and having at least two laterally extending, longitudinally spaced, substantially horizontal surfaces, of a width to support the inverted boat with the gunnels thereof engaging the surfaces, a roller mounted on the inverted left front gunnel of the boat and extending downwardly therefrom, the roller being positioned substantially in a vertical plane extending from the inverted right rear corner of the boat through the center of gravity of the boat, and a guide beam for the roller mounted on the rack and extending from just short of the roller towards the right rear side of the boat but terminating short thereof.

4. A one-man car top boat carrying assembly, including
a boat,
a rack adapted to be secured to the top of a car and having a substantially horizontal one-piece plane surface of a width to support the boat in inverted position with the gunnels of the boat engaging the surface,
a roller mounted on the gunnel near the bow of the inverted boat and extending downwardly therefrom, the roller being positioned substantially in a vertical plane extending from the right rear corner of the inverted boat through the center of gravity of the boat, the axis of the roller being substantially perpendicular to the plane,
an open-topped channel mounted on the rack and extending from just short of the roller generally towards the right rear corner of the boat but terminating short of the corner,
a stop at the rear of the channel, and
wheels on the lower rear corners of the inverted boat.

References Cited by the Examiner

UNITED STATES PATENTS 2,600,082  6/1952  Sumner _____ 214—450
2,722,326  11/1955  Conroy _____ 214—450

HUGO O. SCHULZ, *Primary Examiner.*